United States Patent
Sugiura et al.

(10) Patent No.: US 11,479,018 B2
(45) Date of Patent: Oct. 25, 2022

(54) BARRIER FILM FOR ELECTRONIC DEVICES

(71) Applicant: TOYO SEIKAN GROUP HOLDINGS, LTD., Tokyo (JP)

(72) Inventors: Chiho Sugiura, Tokyo (JP); Yusuke Obu, Tokyo (JP); Kenji Hayashi, Tokyo (JP); Yutaka Kawakubo, Tokyo (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 17/040,088

(22) PCT Filed: Apr. 1, 2019

(86) PCT No.: PCT/JP2019/014519
§ 371 (c)(1),
(2) Date: Sep. 22, 2020

(87) PCT Pub. No.: WO2019/189932
PCT Pub. Date: Oct. 3, 2019

(65) Prior Publication Data
US 2021/0023817 A1 Jan. 28, 2021

(30) Foreign Application Priority Data
Mar. 30, 2018 (JP) .............................. JP2018-069257

(51) Int. Cl.
*B32B 7/022* (2019.01)
*B32B 27/08* (2006.01)
(Continued)

(52) U.S. Cl.
CPC .............. *B32B 7/022* (2019.01); *B32B 27/08* (2013.01); *B32B 27/30* (2013.01); *B32B 27/34* (2013.01);
(Continued)

(58) Field of Classification Search
CPC ......... B32B 7/022; B32B 27/08; B32B 27/30; B32B 27/34; B32B 2457/12; B32B 2457/206; B32B 2457/208
See application file for complete search history.

(56) References Cited

U.S. PATENT DOCUMENTS 6,432,516 B1 8/2002 Terasaki et al.
2006/0216457 A1 9/2006 Takahashi et al.
(Continued)

FOREIGN PATENT DOCUMENTS

CN 1252757 A 5/2000
CN 1842231 A 10/2006
(Continued)

OTHER PUBLICATIONS

International Search Report of PCT/JP2019/014519 dated May 21, 2019 [PCT/ISA/210].
(Continued)

*Primary Examiner* — Michael C Miggins
(74) *Attorney, Agent, or Firm* — Sughrue Mion, PLLC

(57) ABSTRACT

A barrier film for electronic devices exhibiting and maintaining excellent water barrier property. The barrier film for electronic devices features a water permeability (23° C., RH50%) that is set to be not more than $10^{-4}$ g/m²/day and a water content that is maintained to be not more than 2000 ppm.

5 Claims, 1 Drawing Sheet

(51) Int. Cl.
    *B32B 27/30*     (2006.01)
    *B32B 27/34*     (2006.01)

(52) U.S. Cl.
    CPC ..... *B32B 2457/12* (2013.01); *B32B 2457/206* (2013.01); *B32B 2457/208* (2013.01)

(56) References Cited

U.S. PATENT DOCUMENTS

| | | |
|---|---|---|
| 2014/0291655 A1 | 10/2014 | Suzuki et al. |
| 2015/0045509 A1 | 2/2015 | Tomatsu et al. |
| 2015/0368498 A1* | 12/2015 | Okuyama ............... B32B 27/18 428/447 |
| 2016/0020423 A1* | 1/2016 | Saito .................. H01L 27/3241 257/40 |
| 2016/0243801 A1 | 8/2016 | Okuyama et al. |
| 2017/0047548 A1 | 2/2017 | Mieda et al. |
| 2017/0067151 A1 | 3/2017 | Nangou et al. |
| 2021/0122147 A1 | 4/2021 | Kawanishi et al. |

FOREIGN PATENT DOCUMENTS

| | | |
|---|---|---|
| CN | 101589475 A | 11/2009 |
| CN | 107249873 A | 10/2017 |
| CN | 107409447 A | 11/2017 |
| CN | 112203839 A | 1/2021 |
| EP | 2 096 680 A1 | 9/2009 |
| EP | 3 178 647 A1 | 6/2017 |
| EP | 3 778 426 A1 | 2/2021 |
| JP | 2000-255579 A | 9/2000 |
| JP | 2010-163189 A | 7/2010 |
| JP | 2014-019056 A | 2/2014 |
| JP | 2014-195911 A | 10/2014 |
| JP | 2015-096320 A | 5/2015 |
| JP | 5764687 B1 | 8/2015 |
| WO | 2013/147156 A1 | 10/2013 |
| WO | 2013/162063 A1 | 10/2013 |
| WO | 2015/008708 A1 | 1/2015 |
| WO | 2015/133441 A1 | 9/2015 |
| WO | 2016/009778 A1 | 1/2016 |

OTHER PUBLICATIONS

Communication dated Mar. 11, 2022 from the Japanese Patent Office in Japanese Application No. 2018-069257.
Communication issued Dec. 20, 2021 from the China National Intellectual Property Administration in v Chinese Application No. 201980024153.0.
Database WPI, Week 201563, Sep. 11, 2015, Thomson Scientific, London, GB, An 2015-540131, XP002804760 (4 pages total).
Database WPI, Week 201510, Feb. 2, 2015, Thomson Scientific, London, GB, an 2015-08628G, XP002804759 (3 pages total).
Extended European Search Report dated Nov. 29, 2021 from the European Patent Office in EP Application No. 19774910.4.

* cited by examiner

BARRIER FILM FOR ELECTRONIC DEVICES

CROSS REFERENCE TO RELATED APPLICATIONS

This application is a National Stage of International Application No. PCT/JP2019/014519, filed Apr. 1, 2019, claiming priority to Japanese Patent Application No. 2018-069257, filed Mar. 30, 2018.

TECHNICAL FIELD

This invention relates to a barrier film used as a member for sealing electronic devices such as organic electroluminescent (EL) devices, solar cells and the like.

BACKGROUND ART

In order to avoid leakage of electric charges caused by water, a high degree of water barrier property is required for a variety of electronic devices that have been developed and put into practical use in recent years, such as organic electroluminescent (organic EL) devices, solar cells, touch panels and electronic papers.

As means for improving properties and, specifically, gas-barrier properties of various plastic substrates, there has been known an art of forming a thin inorganic film (inorganic barrier layer) of silicon oxide by vapor deposition on the surfaces of the plastic substrates (patent document 1). The film provided with such a thin inorganic film has been widely used as a barrier film. The barrier film, however, is not sufficient for fulfilling the water barrier property required for the above-mentioned electronic devices. Besides, the water remaining in the resin used as the plastic substrates causes the devices to be strikingly deteriorated.

To satisfy such requirements, furthermore, there has been proposed a water barrier laminate having a structure on which a water-trapping layer is laminated, the water-trapping layer using a hygroscopic ionic polymer as the matrix (patent document 2).

The water-trapping layer is formed by applying a coating composition for forming the ionic polymer-containing trapping layer on the inorganic barrier layer that is formed on the surface of a plastic film by vapor deposition or the like method, followed by curing. Upon forming the trapping layer, the water-trapping layer exhibits improved water barrier property.

Even by using the barrier film capable of exhibiting improved water barrier property, however, the problem has not yet been solved, i.e., the devices are deteriorated by the water remaining in the resin that is used as the plastic substrates.

PRIOR ART DOCUMENTS

Patent Documents

Patent document 1: Japanese Patent Laid-Open No. 2000-255579
Patent document 2: Japanese Patent Laid-Open No. 2015-96320

OUTLINE OF THE INVENTION

Problems that the Invention is to Solve

It is, therefore, an object of the present invention to provide a barrier film for electronic devices, which exhibits excellent water barrier property, suppresses the devices from being deteriorated by the water remaining in the resin that is used as the plastic substrates, and excellently maintains the water barrier property.

Means for Solving the Problems

According to the present invention, there is provided a barrier film for electronic devices characterized by having a water permeability (23° C., RH50%) that is set to be not more than $10^{-4}$ g/m$^2$/day and a water content that is maintained to be not more than 2000 ppm.

In the invention, the following embodiments can be preferably employed.
(1) The water content is maintained to be not more than 100 ppm;
(2) The barrier film has at least one inorganic barrier layer;
(3) The barrier film has a plastic substrate layer that lies under the inorganic barrier layer;
(4) The plastic substrate layer is formed by using a polyester resin, a polyimide resin or a cyclic olefin resin;
(5) The barrier film is provided with a water-trapping layer;
(6) The water-trapping layer is a layer that contains an ionic polymer;
(7) The barrier film includes the plastic substrate layer and the inorganic barrier layer formed on the substrate layer, and a water-trapping layer is formed on the inorganic barrier layer;
(8) The barrier film is stored being removably held by a desiccant sheet.
(9) The barrier film is sandwiched by the desiccant sheets; and
(10) The desiccant sheet includes a hygroscopic resin layer in which a desiccant is dispersed and a surface protection resin layer formed on one surface of the hygroscopic resin layer, the surface protection resin layer having a water permeability of not more than 40 g/m$^2$·day at 40° C. and 90% RH, and the other surface of the hygroscopic resin layer being so arranged as to face the barrier film.

Effects of the Invention

The barrier film of the present invention is used as a member for sealing a variety of kinds of electronic devices, and works to effectively prevent the water from infiltrating into the interior of the devices. Here, a particularly important feature resides in that the barrier film has a water permeability (23° C., RH50%) that is set to be not more than $10^{-4}$ g/m$^2$/day and a water content that is maintained to be not more than 2000 ppm and, specifically, not more than 100 ppm. Namely, the barrier film of the present invention has an excellent water barrier property and a water content that is maintained to be very small. When used, therefore, the barrier film is capable of exhibiting excellent water barrier property over extended periods of time since the water content therein has been maintained to be very small.

MODES FOR CARRYING OUT THE INVENTION

The barrier film of the present invention has a water permeability (23° C., RH50%) that is set to be not more than $10^{-4}$ g/m$^2$/day, more preferably, not more than $10^{-5}$ g/m$^2$/day and, most preferably, not more than $10^{-6}$ g/m$^2$/day, and a water content that is maintained to be not more than 2000 ppm and, specifically, not more than 100 ppm. By overlapping a plurality of the inorganic barrier layers one upon the other or by being fabricated in a multilayered structure including a water-trapping layer that absorbs and traps the water, the barrier film of the present invention having such a low water permeability and a small water content becomes capable of improving the barrier property against oxygen or against the water and hence becomes capable of exhibiting improved performance as a sealing member for a variety of kinds of devices.

Figure 1:
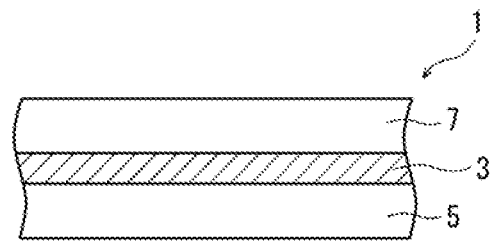
FIG. 1 It is a side sectional view schematically illustrating a structure of layers of a barrier film of the present invention.

FIG. 1 illustrates a structure of layers of such a barrier film.

Referring to FIG. 1, the barrier film of the present invention generally designated at 1 includes an inorganic barrier layer 3 which is suitably held on a plastic substrate layer 5 that is serving as an underlying layer. As required, further, a water-trapping layer 7 is provided on the inorganic barrier layer 3 to improve water barrier property.

That is, the barrier film 1 of the present invention may be a film of the single inorganic barrier layer 3 so far as it satisfies the predetermined water permeability and the water content. When it is to be used as a member for sealing a variety of kinds of electronic devices that require a high degree of water barrier property, however, the barrier film is fabricated in a multilayered structure inclusive of a water-trapping layer 7 that is formed on the inorganic barrier layer 1 in order to satisfy the required water barrier property. Based on this layer structure, the barrier film exhibits the above-mentioned water permeability and has the water content that is set to lie in a predetermined range.

<Inorganic Barrier Layer 3>

The inorganic barrier layer 3 is formed on the plastic substrate layer 5 which serves as an underlying layer, and may be a layer that has been widely known as taught in, for example, Japanese Patent Laid-Open No. 2015-96320. From the standpoint of securing a high degree of oxygen barrier property, the inorganic barrier layer 3 should, preferably, be an inorganic film deposited by a physical vapor deposition such as sputtering, vacuum vapor deposition or ion plating, or by a chemical vapor deposition such as plasma CVD, and should, for example, be a film formed by using various kinds of metals or metal oxides. Specifically, the inorganic barrier layer 3 should, preferably, be the one formed by the plasma CVD from the standpoint of exhibiting excellent barrier property against not only the oxygen but also the water.

Here, to form the film by the plasma CVD, the plastic substrate layer 5 of the form of a film that lies under the inorganic barrier layer 3 is arranged in a plasma treatment chamber that is maintained at a predetermined degree of vacuum, a gas (reaction gas) of a metal or a compound of the metal for forming the film and an oxidizing gas (usually oxygen gas or NOx gas) are fed together with a suitable carrier gas such as argon or helium, through gas feed pipes, into the plasma treatment chamber which is shielded with a metal wall and in which the pressure is reduced to a predetermined decree of vacuum, a glow discharge is generated in this state in a microwave electric field or a high-frequency electric field, a plasma is generated by utilizing the electric energy thereof, and a product decomposed from the compound is deposited on the surface of the plastic substrate layer 5 thereby to form the film.

As the reaction gas, in general, there can be preferably used a gas of an organometal compound from the standpoint of forming a film that includes a flexible resin containing carbon on the surface of the underlying substrate layer 5 and a highly oxidized region having a high degree of barrier property thereon. For example, it is desired to use a gas of an organoaluminum compound such as trialkylaluminum, or a gas of an organotitanium compound, an organozirconium compound or an organosilicon compound. Specifically, it is most desired to use the organosilicon compound from the standpoint of relatively easily and efficiently forming the inorganic barrier layer 3 that has a high degree of barrier property against oxygen.

As the organosilicon compound, there can be exemplified organosilane compounds such as hexamethyldisilane, vinyltrimethylsilane, methylsilane, dimethylsilane, trimethylsilane, diethylsilane, propylsilane, phenylsilane, methyltriethoxysilane, vinyltriethoxysilane, vinyltrimethoxysilane, tetramethoxysilane, tetraethoxysilane, phenyltrimethoxysilane, methyltrimethoxysilane and methyltriethoxysilane, as well as organosiloxane compounds such as octamethylcyclotetrasiloxane, 1,1,3,3-tetramethyldisiloxane and hexamethyldisiloxane. There can be, further, used aminosilane and silazane in addition to them.

The above-mentioned organometal compounds can be used alone or in a combination of two or more kinds.

The thickness of the inorganic barrier layer 3 may be set depending on the thickness of the underlying plastic substrate layer 5 so as to satisfy a predetermined water permeability. Usually, the inorganic barrier layer 3 may have a thickness of 4 to 500 nm and, specifically, about 30 to about 400 nm.

The above-mentioned inorganic barrier layer 3 can also be formed on the plastic substrate layer 5 by a coating method instead of such means as vapor deposition. That is, the inorganic barrier layer 3 formed by the coating method has the oxygen barrier property lower than that of the inorganic barrier layer formed by the vapor deposition. Depending upon the required degree of barrier property against oxygen, however, the inorganic barrier layer 3 formed by the coating method will suffice for the need.

As for forming the inorganic barrier layer 3 by the coating method, a representative example comprises preparing an organic solvent solution which contains a polysilazane or a polycondensable silane compound (e.g., alkoxysilane, etc.) and a polycondensable alumina compound (e.g., alkoxyaluminum, etc.) as film-forming components and, further, contains inorganic fine particles such as of silica or alumina, applying the organic solvent solution onto a predetermined surface followed by heating thereby to volatilize the organic solvent and thus to form the film.

<Plastic Substrate Layer 5>

As described already, the plastic substrate layer 5 lies under the inorganic barrier layer 3 that will be described later, and is, usually, formed by using a thermoplastic or thermosetting resin by such a method as injection or co-injection forming, extrusion or co-extrusion forming, film- or sheet-forming method, compression forming method or cast polymerization method depending on the form of the resin.

Usually, the thermoplastic resin is preferred from the standpoint of formability and cost.

As the thermoplastic resin, there can be exemplified polyolefins such as low-density polyethylene, high-density polyethylene, polypropylene, poly 1-butene, poly 4-methyl- 1-pentene and random or block copolymers of α-olefins (such as ethylene, propylene, 1-butene, and 4-methyl-1-pentene); cyclic olefin resins such as cyclic olefin copolymer and cyclic olefin polymer; ethylene vinyl compound copolymers such as ethylene vinyl acetate copolymer, ethylene.vinyl alcohol copolymer and ethylene.vinyl chloride copolymer; styrene resins such as polystyrene, acrylonitril.styrene copolymer, ABS, and α-methylstyrene.styrene copolymer; polyvinyl compounds such as polyvinyl chloride, polyvinylidene chloride, vinyl chloride.vinylidene chloride copolymer, methyl polyacrylate and methyl polymethacrylate; polyamides such as nylon 6, nylon 6-6, nylon 6-10, nylon 11 and nylon 12; thermoplastic polyesters such as polyethylene terephthalate (PET), polybutylene terephthalate and polyethylene naphthalate (PEN); polycarbonate; polyphenylene oxide; as well as polyimide resin, polyamideimide resin, polyetherimide resin, fluorine-contained resin, allyl resin, polyurethane resin, cellulose resin, polysulfone resin, polyethersulfone resin, ketone resin, amino resin and biodegradable resins such as polylactic acid. There can be further used a blend thereof or the above resins that are suitably modified upon being copolymerized (e.g., acid-modified olefin resin, etc.).

It is, further, desired that the substrate layer 5 is formed by using a gas barrier resin having excellent oxygen barrier property, such as ethylene.vinyl alcohol copolymer. Or the substrate layer 5 may have a multilayered structure that includes a layer formed by using the gas barrier resin.

In the invention, it is more preferred to use, as the substrate layer 5, a film of a polyester resin such as polyethylene terephthalate (PET), polybutylene terephthalate or polyethylene naphthalate, a film of a polyimide resin or a cyclic olefin copolymer, or a film of a cyclic olefin resin such as cyclic olefin copolymer or cyclic olefin polymer from such standpoints as easy availability, cost, formability, barrier property against oxygen to some extent, and as being suited to be formed under the inorganic barrier layer 3 that will be described later.

There is no specific limitation on the thickness of the plastic substrate layer 5. If the thickness is too large, however, the barrier film 1 acquires an increased water permeability, and it may become difficult to satisfy the above-mentioned water permeability. Besides, the barrier film 1 loses flexibility. Therefore, the thickness of the substrate layer 5 is, usually, set to be not more than 200 μm and, preferably, not more than 125 μm and, in this range, the water permeability of the barrier film 1 is adjusted to lie within the above-mentioned range.

<Water-Trapping Layer 7>

In the invention, the water-trapping layer 7 works to shut off the water that flows in the direction of thickness of the barrier film 1, and is provided when a high degree of water barrier property is required.

The water-trapping layer 7 is not specifically limited provided it exhibits water shut-off property, and may itself be a widely known layer such as the one formed by dispersing a hygroscopic agent such as zeolite in a predetermined resin layer. However, when a high degree of barrier property against the water is required, e.g., when it is desired to realize a water permeability (23° C., RH50%) of not more than $10^{-5}$ g/m²/day and, specifically, not more than $10^{-6}$ g/m²/day, it is desired that the water-trapping layer 7 is formed by using an ionic polymer that is disclosed in the Japanese Patent Laid-Open No. 2015-96320. More desirably, the water-trapping layer 7 is formed by using the ionic polymer as the matrix and by dispersing, in the matrix, a hygroscopic agent having an ultimate humidity lower than that of the ionic polymer. Upon using the ionic polymer as the matrix, the water-trapping layer 7 excellently traps the water. When the hygroscopic agent having a lower ultimate humidity is dispersed therein, furthermore, the water-trapping layer 7 can be effectively prevented from being deformed or swollen that results from the absorption of water.

The ionic polymers preferably used for forming the water-trapping layer 7 can be divided into cationic polymers and anionic polymers.

The cationic polymer is a polymer that has, in the molecules thereof, a cationic group that could form a positive electric charge in water, such as primary to tertiary amino groups, quaternary ammonium group, pyridyl group, imidazole group or quaternary pyridinium. With this cationic polymer, the cationic group exhibits a strong nucleophilic action and traps the water by hydrogen bond. Namely, the cationic polymer forms a hygroscopic matrix.

The amount of the cationic groups in the cationic polymer should, usually, be such that the polymer acquires a coefficient of water absorption (JIS K-7209-1984) of not less than 20% and, specifically, 30% to 45% in an atmosphere of a humidity of 80% RH and 30° C.

As the cationic polymer, there can be used at least one of the cationic monomers as represented by amine monomers such as allylamine, ethyleneimine, vinylbenzyltrimethylamine, [4-(4-vinylphenyl)-methyl]-trimethylamine and vinylbenzyltriethylamine; nitrogen-contained heterocyclic monomers such as vinylpyridine and vinylimidazole; and salts thereof, being suitably polymerized or copolymerized with any other monomers copolymerizable therewith and, further as required, being partly neutralized with an acid.

Such cationic polymers have been closely described in the Japanese Patent Laid-Open No. 2015-96320, etc., and are not repeated here. Usually, however, a polyallylamine is preferably used from the standpoint of forming films.

The anionic polymer, on the other hand, is a polymer that has, in the molecules thereof, an anionic functional group that could form a negative electric charge in water, such as carboxylic acid group, sulfonic acid group, phosphonic acid group, or an acidic base formed by partly neutralizing the above-mentioned groups. With this anionic polymer having such a functional group, the functional group traps the water by hydrogen bond. Namely, the anionic polymer forms a hygroscopic matrix.

Like the case of the above-mentioned cationic polymer, the amount of the anionic functional groups in the anionic polymer should be such that the polymer acquires a coefficient of water absorption (JIS K-7209-1984) of not less than 20% and, specifically, 30% to 45% in an atmosphere of a humidity of 80% RH and 30° C. though the amount may vary depending on the kind of the functional group.

As the anionic polymer having the above functional group, there can be used at least one of the anionic monomers as represented by carboxylic acid monomers such as methacrylic acid, acrylic acid, and maleic anhydride; sulfonic acid monomers such as α-halogenated vinylsulfonic acid, styrenesulfonic acid and vinylsulfonic acid; phosphonic acid monomers such as vinylphosphoric acid, etc.; and salts of these monomers, being suitably polymerized or copolymerized with any other monomers copolymerizable therewith and, further as required, being partly neutralized with an alkali.

Such anionic polymers, too, have been closely described in the Japanese Patent Laid-Open No. 2015-96320, etc., and are not repeated here. Usually, however, there is preferably used a poly(meth) acrylic acid or a partly neutralized product thereof (e.g., the product thereof which is partly an Na salt).

As the hygroscopic agent which, upon being contained in the ionic polymer, works to prevent the deformation caused by swelling, i.e., as the hygroscopic agent having an ultimate humidity lower than that of the ionic polymer, there can be exemplified those that have ultimate humidities of not more than 6% under an environmental condition of a humidity of 80% RH and a temperature of 30° C. Namely, when the hygroscopic agent has an ultimate humidity higher than that of the ionic polymer, the water absorbed by the matrix cannot be confined therein sufficiently but may be released. On the other hand, when the ionic polymer is blended with the hygroscopic agent having an ultimate humidity lower than that of the ionic polymer, the water can be effectively trapped even in an atmosphere of a low humidity and, besides, the water absorbed by the ionic polymer can also be trapped by the hygroscopic agent. Thus the ionic polymer exhibits a high degree of water barrier property suppressing the release of water.

The above hygroscopic agents, in general, have coefficients of water absorption (JIS K-7209-1984) of not less than 50% in an atmosphere of a humidity of 80% RH and a temperature of 30° C., and include those of the inorganic type and those of the organic type.

As the inorganic hygroscopic agent, there can be exemplified clay minerals such as zeolite, alumina, active carbon and montmorillonite as well as silica gel, calcium oxide and magnesium sulfate.

As the organic hygroscopic agent, there can be exemplified anionic polymer or a crosslinked product of a partly neutralized product thereof. As the anionic polymer, there can be exemplified at least one of the anionic monomers as represented by carboxylic acid monomers ((meth)acrylic acid, maleic anhydride, etc.), sulfonic acid monomers (halogenated vinylsulfonic acid, styrenesulfonic acid, vinylsulfonic acid, etc.), phosphonic acid monomers (vinylphosphoric acid, etc.), and at least one of the anionic monomers represented by salts of those monomers which is polymerized or copolymerized with any other monomers. In the use where transparency is required, an organic hygroscopic agent is effectively used. For instance, a crosslinked sodium poly (meth) acrylate in a fine granular form serves as a representative organic hygroscopic agent.

Among the above hygroscopic agents, a hygroscopic agent having a small grain size (e.g., having a mean primary grain size of not more than 100 nm and, specifically, not more than 80 nm) is preferred and, specifically, a hygroscopic agent of an organic polymer having a small grain size is most desired from the standpoint of realizing a large specific surface area and a high hygroscopic property.

That is, the hygroscopic agent of the organic polymer disperses very favorably in the matrix of the ionic polymer. Besides, upon employing the emulsion polymerization or the suspension polymerization as a polymerization method for its production, the hygroscopic agent of the organic polymer can be obtained in a granular form maintaining a fine and uniform spherical shape. By containing the hygroscopic agent in amounts larger than a certain ratio, therefore, there can be secured a very high degree of transparency.

The organic fine granular hygroscopic agent has a very low ultimate humidity as described above and exhibits a high hygroscopic property and besides, upon being crosslinked, shows a very decreased change in volume caused by swelling. Therefore, the organic fine granular hygroscopic agent is best suited for lowering the humidity in the environmental atmosphere down to the absolute dry condition or down to nearly the absolute dry condition yet suppressing a change in the volume thereof.

As the organic fine granular hygroscopic agent, a crosslinked fine granular sodium polyacrylate (mean grain size of about 70 nm) has been placed in the market by Toyobo K.K. in the form of a colloidal dispersion solution (pH=10.4) and in the trade name of TAFTIC HU-820E.

In the invention, the amount of the hygroscopic agent is set depending on the kind of the ionic polymer from the standpoint of enabling its properties to be exhibited to a full extent, improving the water barrier property to a striking degree and effectively suppressing a change in the size caused by the swelling and, further, securing the water barrier property superior to the barrier property of the inorganic barrier layer 3 for extended periods of time.

For example, when the water-trapping layer 7 is to be formed by dispersing the hygroscopic agent in the cationic polymer, it is desired that the hygroscopic agent is made present in an amount of, usually, not less than 50 parts by mass, specifically, 100 to 900 parts by mass and, more specifically, 200 to 600 parts by mass per 100 parts by mass of the cationic polymer. Further, when dispersed in the anionic polymer, it is desired that the hygroscopic agent is made present therein in an amount of not less than 50 parts by mass, specifically, 100 to 1300 parts by mass and, more specifically, 150 to 1200 parts by mass per 100 parts by mass of the anionic polymer.

In the water-trapping layer 7 formed by using the ionic polymer, furthermore, it is desired that a crosslinked structure has been introduced into the ionic polymer. That is, with the crosslinked structure being introduced into the ionic polymer, when the water is absorbed, the molecules of the ionic polymer are locked by each other since they have been crosslinked, therefore, working to suppress a change in the volume caused by the swelling (absorption of water) and contributing to improving the mechanical strength and dimensional stability.

The crosslinked structure can be introduced by adding a crosslinking agent into a coating composition for forming the water-trapping layer 7. Specifically, unlike the cationic polymer, the anionic polymer traps the water relying only upon the hydrogen bond. By introducing a spatial mesh structure (crosslinked structure) suited for absorbing moisture into the matrix, therefore, the hygroscopic property can be improved to a large extent.

The crosslinking agent for introducing the crosslinked structure may differ to some extent depending on when the crosslinked structure is to be introduced into the cationic polymer and when the crosslinked structure is to be introduced into the anionic polymer.

As the crosslinking agent for the cationic polymer as also described in, for example, the Japanese Patent Laid-Open No. 2015-96320, there can be used a compound having a crosslinking functional group (e.g., epoxy group) capable of reacting with a cationic group and a functional group (e.g., alkoxysilyl group) capable of forming a siloxane structure in the crosslinked structure through the hydrolysis and dehydration·condensation. Concretely, there can be preferably used a silane compound represented by the following formula (1):

$$X-SiR^1_n(OR^2)_{3-n} \quad (1)$$

wherein X is an organic group having an epoxy group at a terminal thereof, $R^1$ and $R^2$ are, respectively, methyl groups, ethyl groups or isopropyl groups, and n is 0, 1 or 2.

The silane compound has, as functional groups, the epoxy group and the alkoxysilyl group, and the epoxy group undergoes the addition reaction with a functional group (e.g., $NH_2$) of the cationic polymer. The alkoxysilyl group, on the other hand, forms a silanol group (SiOH group) through the hydrolysis, grows by forming a siloxane structure through the condensation reaction and, finally, forms a crosslinked structure among the cationic polymer chains. Thus the crosslinked structure having a siloxane structure is introduced into the matrix of the cationic polymer.

Besides, the cationic polymer is alkaline. As a result, when the coating composition containing the cationic polymer is applied to form the water-trapping layer B, the addition reaction is accelerated between the cationic group and the epoxy group and, also, the dehydration·condensation are accelerated among the silanol groups enabling the crosslinked structure to be easily introduced.

In the invention, the organic group X having an epoxy group in the above-mentioned formula (1) can be represented by a γ-glycidoxyalkyl group. For example, a γ-glycidoxypropyltrimethoxysilane or a γ-glycidoxypropylmethyldimethoxysilane can be preferably used as the crosslinking agent.

As the crosslinking agent, there can also be preferably used a compound whose epoxy group in the above formula (1) is an alicyclic epoxy group such as epoxycyclohexyl group. For example, when a compound having an alicyclic epoxy group such as β-(3,4-epoxycyclohexyl) ethyltrimethoxysilane is used as the crosslinking agent, an alicyclic structure is introduced together with the siloxane structure into the crosslinked structure of the matrix. Introduction of such an alicyclic structure helps further effectively exhibit the function of the matrix which is to form a spatial mesh structure adapted to absorbing the moisture.

In order to introduce the alicyclic structure into the crosslinked structure, furthermore, there can be used, as the crosslinking agent, a compound having a plurality of epoxy groups and alicyclic groups, e.g., a diglycidyl ester represented by the following formula (2):

$$G-O(C=O)-A-(C=O)O-G \quad (2)$$

wherein G is a glycidyl group, and A is a divalent hydrocarbon group having an aliphatic ring, such as cycloalkylene group.

A representative diglycidyl ester is expressed by the following formula (2-1).

[Chemical 1]

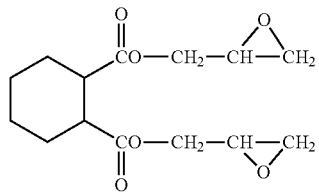

(2-1)

That is, the diglycidyl ester of the formula (2) has no alkoxysilyl group but works to introduce the alicyclic structure into the crosslinked structure. Therefore, the diglycidyl ester of the formula (2) is effective in forming, in the matrix, a spatial mesh structure, that is adapted to absorbing the moisture.

It is desired that the above-mentioned crosslinking agent is used in an amount of 5 to 60 parts by mass and, specifically, 15 to 50 parts by mass per 100 parts by mass of the cationic polymer. It is also desired that at least not less than 70% by mass and, preferably, not less than 80% by mass of the crosslinking agent is the silane compound represented by the above-mentioned formula (1).

As the crosslinking agent for introducing the crosslinked structure into the anionic polymer, furthermore, there can be used a compound having not less than two crosslinkable functional groups (e.g. epoxy groups) that can react with the ionic groups possessed by the ionic polymer as described, say, in the Japanese Patent Laid-Open No. 2015-96320. Namely, there can be desirably used a diglycidyl ester represented by the above formula (2)

$$G-O(C=O)-A-(C=O)O-G \quad (2)$$

wherein G is a glycidyl group, and A is a divalent hydrocarbon group having an aliphatic ring, such as cycloalkylene group, that was exemplified above for the coating composition for forming the cationic matrix.

In the diglycidyl ester of the above formula (2), the epoxy group reacts with the anionic group, and the matrix forms therein the crosslinked structure that includes an alicyclic structure formed by the divalent group A. The crosslinked structure that includes the above alicyclic structure helps suppress the swelling.

Among the above-mentioned diglycidyl esters, what are preferred have been exemplified above already. In particular, from the standpoint of forming a spatial mesh structure that is suited to absorbing the moisture, it is most desired to use the diglycidyl ester represented by the above-mentioned formula (2-1).

The crosslinking agent for the anionic polymer is used in an amount of, desirably, 1 to 50 parts by mass and, specifically, 10 to 40 parts by mass per 100 parts by mass of the anionic polymer.

The water-trapping layer 7 is formed by applying a coating composition that is obtained by dissolving or dispersing a predetermined hygroscopic polymer and a hygroscopic agent in an organic solvent, followed by heating to form a layer thereof and, thereafter, holding the film in a dry atmosphere under a reduced pressure to let the water present in the layer released.

It is also allowable to apply the above coating composition on another organic film to similarly form the water-trapping layer 7. Next, by using an adhesive for dry lamination, the water-trapping layer 7 is adhered onto the inorganic barrier layer 3 that is formed on the above laminated film. In this case, on the water-trapping layer 7 shown in FIG. 1, there is formed, as an organic layer, a film that serves as the underlying layer for the water-trapping layer 7, and an adhesive layer is interposed between the inorganic barrier layer 3 and the water-trapping layer 7.

According to the present invention, as described already, the barrier film 1 has a very small water permeability as set to lie in a predetermined range. That is, to set the water permeability to lie in a predetermined range, there can be employed a layer structure comprising, for example, a plurality of inorganic barrier layers 3 and water-trapping layers 7 not being limited to the above-mentioned layer structure shown in FIG. 1. This kind of structure can be obtained by adhering a plurality of the laminates (barrier films 1) having the layer structure shown in FIG. 1 one upon the other by using the adhesive for dry lamination.

<Water Content of the Barrier Film 1>

The barrier film 1 of the present invention has a very small water permeability that is set to lie in a predetermined range.

In order for the barrier film to exhibit its barrier property to a sufficient degree relying on such a water permeability, the water content thereof must be maintained to be not more than 2000 ppm, preferably, not more than 1000 ppm and, more preferably, not more than 100 ppm. This is because if the water content has not been set to lie in a small range, then the barrier film becomes no longer capable of maintaining the interior of the electronic device in a dry state when it is used for sealing the device.

The water-trapping layer 7 in the barrier film 1 is in a dry state when the film is formed, and has the water content as described above. The water-trapping layer 7, however, gradually absorbs the water in the atmosphere before it is really used. As a result, the water content may increase to become larger than the above-mentioned range.

Therefore, the barrier film 1 of the present invention must be so stored that the water content may not increase before it is really put into use.

The water content can be easily calculated from a difference between the weight of when the barrier film 1 is maintained in an absolute dry condition and the weight (i.e., water content) of when the barrier film 1 is measured in compliance with the following formula.

Water content (%)=100×(A−B)/B wherein A is a weight of the barrier film 1 that is measured, and B is a weight of the barrier film 1 of when it is dried by heating.

As for the form of storage, the barrier film 1 can be vacuum-packed in a pouch formed by using a packing film that comprises a metal foil (e.g., aluminum foil) having a heat-seal layer on the surface thereof. As the simplest form of storage, however, a form of storage shown in FIG. 2 can be favorably employed.

Figure 2:
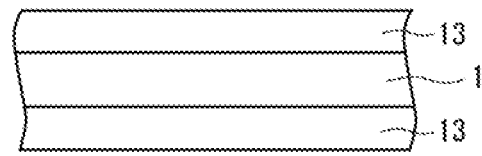
FIG. 2 It is a view illustrating a state of storing the barrier film of the present invention.

Referring to FIG. 2, two pieces of the desiccant sheets 13 and 13 are stuck to the barrier film 1 of the invention in a manner that they can be removed. Namely, the desiccant sheets 13 and 13 effectively prevent the water from infiltrating into the barrier film 1 from the exterior and, besides, absorb the water that is present in the barrier film 1 to remove it. The water content in the barrier film 1 can thus be maintained to lie in the above-mentioned range.

As the desiccant sheet 13 shown in FIG. 2, there can be used the known one that is obtained by dispersing a desiccant such as silica gel or the like in a resin. To more reliably maintain the water content to lie within the above-mentioned range, however, it is desired to use a desiccant sheet 13 of a structure shown in FIG. 3.

Figure 3:
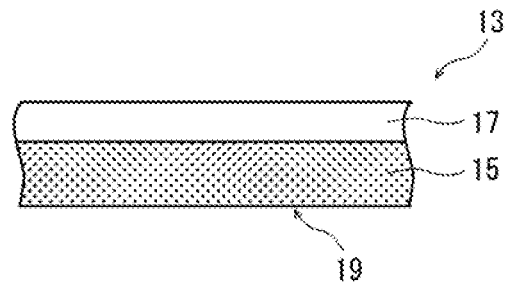
FIG. 3 It is a sectional view schematically illustrating a structure of layers of a desiccant sheet used for storing the barrier film of the present invention.

In FIG. 3, the desiccant sheet 13 includes a hygroscopic resin layer 15 and a surface protection resin layer 17 provided on one surface of the hygroscopic resin layer 15. The other surface of the hygroscopic resin layer 15 (surface thereof on the side where the surface protection resin layer 17 is not provided) serves as a hygroscopically working surface 19 which is to be stuck to the barrier film 1.

In the desiccant sheet 13, the hygroscopic resin layer 15 is a resin layer in which the desiccant is dispersed. As the desiccant, there can be used an inorganic or organic desiccant that has been known per se.

As the inorganic desiccant, there can be exemplified clay minerals such as zeolite, alumina, active carbon and montmorillonite, as well as silica gel, calcium oxide, barium oxide, calcium chloride and magnesium sulfate.

As the organic desiccant, there can be exemplified an anionic polymer or a crosslinked product of a partly neutralized product thereof. As the anionic polymer, there can be exemplified carboxylic acid monomers ((meth)acrylic acid, maleic anhydride, etc.), sulfonic acid monomers (halogenated vinylsulfonic acid, styrenesulfonic acid, vinylsulfonic acid, etc.), phosphoric acid monomers (vinylphosphoric acid, etc.), as well as at least one of the anionic monomers represented by the salts of these monomers and which is polymerized or copolymerized with other monomers.

In the invention, from the standpoint of effectively trapping the water released from the barrier film 1, it is more preferred to use a desiccant that exhibits chemical adsorption based on the reaction with the water, such as calcium oxide more preferably than to use a desiccant that traps the water based on the physical adsorption, such as zeolite or silica gel.

It is, further, desired that the desiccant has a small grain size from such a standpoint that it can be homogeneously dispersed in the resin and that it has a large specific surface area. It is desired that the desiccant has a mean primary grain size (D50) of not more than 20 μm calculated as volume as measured, for example, by the laser diffraction·light scattering method. Usually, it is desired that the desiccant is dispersed in the hygroscopic resin layer 15 in an amount of 5 to 80 parts by mass per 100 parts by mass of the resin which is the matrix.

As the resin which is the matrix in the hygroscopic resin layer 15, there can be used any known thermoplastic resin without any particular limitation. Usually, however, there is preferably used an olefin resin such as low-density polyethylene, high-density polyethylene, polypropylene, poly 1-butene, poly 4-methyl-1-pentne, a random or block copolymer of α-olefins (such as ethylene, propylene, 1-butene or 4-methyl-1-pentene) or a cyclic olefin copolymer thereof from the standpoint of stickiness to the surface protection resin layer 17 that will be described later or the barrier film 1. Among the above olefin resins, the present invention preferably uses a low-density polyethylene (LDPE), a linear low-density polyethylene (LLDPE), a polypropylene (PP) or a blend thereof and, specifically, the low-density polyethylene (LDPE) or the linear low-density polyethylene (LLDPE) from the standpoint of specifically low hygroscopic property, effectively preventing the release of water from the hygroscopic resin layer 15 and preventing the desiccant from losing its activity prior to its use.

The surface protection resin layer 17 is a layer that prevents the water from infiltrating into the hygroscopic resin layer 15 from the atmosphere. To secure such a water-barrier property, the surface protection resin layer 17 must have a water permeability at 40° C., 90% RH of not more than 40 g/m2/day and, specifically, not more than 20 g/m$^2$/day. If the water permeability is high, the hygroscopic property of the desiccant in the hygroscopic resin layer 15 is spoiled in short periods of time due to the infiltration of water from the atmosphere during the steps of production before executing the drying treatment that will be described later or during the step of handling the materials.

There is no specific limitation on the resin that is used for forming the surface protection resin layer 17 provided it is capable of securing the water permeability mentioned above. From the standpoint of satisfying the water permeability despite of a small thickness, however, it is desired to use the olefin resin that is used for forming the hygroscopic resin layer 15, or the thermoplastic polyester such as polyethylene terephthalate (PET), polybutylene terephthalate or polyethylene naphthalate (PEN). More desirably, there can be used the olefin resin. From the standpoint of attaining a favorable adhesion to the hygroscopic resin layer 15, it is most desired to use the ethylene resin or the propylene resin.

Upon forming the surface protection resin layer 17 by using the above-mentioned resin, the predetermined water permeability can be satisfied with a thickness of, for example, not more than 40 μm and, specifically, not more than 30 μm.

With the desiccant sheet 13 used by the present invention as will be understood from the foregoing description, the surface protection resin layer 17 prevents the water from infiltrating into the hygroscopic resin layer 15 from the atmosphere. Besides, the other surface of the hygroscopic resin layer 17 serves as the hygroscopically working surface 19. Namely, the water infiltrating through the surface 19 is trapped by the desiccant.

According to the present invention, the hygroscopically working surface 19 of the desiccant sheet 13 is stuck to the barrier film 1 which is then sandwiched by the desiccant sheets 13 as shown in FIG. 2. The water content of the barrier film 1 can thus be maintained to lie in a predetermined range.

When the barrier film 1 is to be rolled up and stored, the desiccant sheets 13 may be provided on the surfaces of the water-trapping layer 7; i.e., the barrier film 1 needs not be sandwiched by the desiccant sheets 13.

Here, to stick the desiccant sheet 13, the hygroscopically working surface 19 may be temporarily stuck directly to the barrier film 1 by utilizing the blocking property of the resin that is forming the hygroscopically working surface. Usually, however, the desiccant sheet 13 is stuck by using an adhesive to reliably prevent inconveniences such as removal, etc. during the storage and transport.

When stuck to the barrier film 1 by using the adhesive, an adhesive layer is formed between the hygroscopically working surface 19 and the barrier film 1. Here, however, the adhesive layer (not shown in FIG. 2) should not impair the hygroscopic property of the hygroscopically working surface 19. Accordingly, it is necessary that the adhesive layer has a water permeability larger than that of the above-mentioned surface protection resin layer 17, say, has a water permeability at, for example, 40° C., 90% RH of not less than 40 g/m$^2$/day and, specifically, not less than 60 g/m$^2$/day.

As the adhesive agent, there can be used any known adhesive agent such as (meth) acrylic adhesive agent or urethane adhesive agent. By using these adhesive agents, there may be formed an adhesive layer in a thickness of not more than a predetermined value (e.g., not more than 30 μm) so as to secure the water permeability described above.

It is also allowable to use, as the adhesive agent, an ethylene.vinyl acetate copolymer (EVA), a soft polyolefin (LLDPE) and a metallocene polyolefin elastomer.

It is, further, desired that the adhesive agent has an adhesive force that is so adjusted as to be not more than 0.3 N/25 mm when adhered to the surface of the barrier film 1 to which the desiccant sheet 13 is stuck. This is because if the adhesive force is too large, then the surface of the barrier film 1 (e.g., surface of the water-trapping layer) may be damaged when the desiccant sheet 13 is removed.

The adhesive force can be adjusted by either introducing a crosslinked structure into high molecules forming the adhesive agent or by adding a lubricant or the like into the adhesive agent depending on the material of the surface of the barrier film 1 to which the desiccant sheet 13 is stuck.

The above-mentioned desiccant sheet 13 can be easily formed by, for example, coextruding the desiccant-containing resin composition for forming the hygroscopic resin layer 15 and the resin for forming the surface protection resin layer 17. When the adhesive agent is used, the desiccant sheet 13 is formed by applying the adhesive agent by using a roll onto the surface of the hygroscopic resin layer 15 that is formed as described above, or by applying an adhesive agent-coating composition containing a solvent followed by drying to a suitable extent. The desiccant sheet 13 can also be formed by coextruding three layers inclusive of the layer of the resin used as the adhesive agent.

<Use>

The barrier film 1 of the present invention exhibits excellent water barrier property yet suppressing its water permeability within a very narrow range. After heated and dried, the barrier film 1 is stored being sandwiched by, for example, the desiccant sheets 13 as described above. In this case, the water content of the barrier film 1 can be maintained to be not more than 2000 ppm for extended periods of time. When, for example, the barrier film 1 sandwiched by two pieces of desiccant sheets 13 as shown in FIG. 2 was left to stand in the open air for several months, it was confirmed that the water content of the barrier film 1 had been maintained to be not more than 600 ppm.

Therefore, by removing the desiccant sheets 13, the barrier film 1 that is maintaining the low water content as described above is used as a material for sealing predetermined electronic devices. For example, by using a pressure-sensitive adhesive agent, the barrier film 1 is stuck to the device to seal it. The interior of the device can thus be maintained in a dry state. That is, the barrier film 1 of the present invention is put to use in a state in which the water content is maintained in a very low range. Accordingly, its excellent water barrier property is exhibited over extended periods of time, and the interior of the device can be stably maintained in a dry state.

There is no specific limitation on the electronic devices to which the barrier film 1 of the present invention can be applied. Namely, the barrier film 1 of the invention can be applied to a variety of kinds of electronic devices or organic devices that must avoid leakage of electric charge caused by water, such as organic EL devices, solar cells, touch panels, electronic panels and the like.

DESCRIPTION OF REFERENCE NUMERALS

1: barrier film
3: inorganic barrier layer
5: plastic substrate layer
7: water-trapping layer
13: desiccant sheet
15: hygroscopic resin layer
17: surface protection resin layer
19: hygroscopically working surface

The invention claimed is:

1. An assembly of a barrier film and a desiccant sheet for electronic devices, the barrier film being characterized by having a water permeability (23° C., RH50%) that is set to be not more than $10^{-4}$ g/m$^2$/day and a water content that is maintained to be not more than 2000 ppm,
  wherein said barrier film has at least one inorganic barrier layer,
  said barrier film, further, having a plastic substrate layer of a polyester resin, a polyimide resin or a cyclic olefin resin under said inorganic barrier, and
  said barrier film being, further, provided with a water-trapping layer that contains an ionic polymer on said inorganic barrier layer.

2. The barrier film for electronic devices according to claim 1, wherein said water content is maintained to be not more than 100 ppm.

3. The assembly according to claim 1, wherein said barrier film is stored being removably held by a desiccant sheet.

4. The assembly according to claim 3, wherein said barrier film is sandwiched by two of said desiccant sheets.

5. The assembly according to claim 3, wherein said desiccant sheet includes a hygroscopic resin layer in which a desiccant is dispersed and a surface protection resin layer formed on one surface of said hygroscopic resin layer, said surface protection resin layer having a water permeability of not more than 40 $g/m^2$ day at 40° C. and 90% RH, and the other surface of said hygroscopic resin layer being so arranged as to face said barrier film.

\* \* \* \* \*